United States Patent
Li et al.

(10) Patent No.: US 9,786,305 B1
(45) Date of Patent: Oct. 10, 2017

(54) MAGNETIC READ APPARATUS HAVING MULTIPLE READ SENSORS WITH REDUCED SENSOR SPACING USABLE IN TWO-DIMENSIONAL MAGNETIC RECORDING APPLICATIONS

(71) Applicant: Western Digital (Fremont), LLC, Fremont, CA (US)

(72) Inventors: Shaoping Li, San Ramon, CA (US); Shihai He, Fremont, CA (US); Gerardo A. Bertero, Redwood City, CA (US); Ming Mao, Dublin, CA (US); Yuankai Zheng, Fremont, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 15/152,889

(22) Filed: May 12, 2016

(51) Int. Cl.
*G11B 5/39* (2006.01)

(52) U.S. Cl.
CPC .......... *G11B 5/3912* (2013.01); *G11B 5/3909* (2013.01); *G11B 5/3948* (2013.01); *G11B 5/3951* (2013.01)

(58) Field of Classification Search
CPC .... G11B 5/3909; G11B 5/3912; G11B 5/3948
USPC ..................... 360/316, 319, 324.2
See application file for complete search history.

(56) References Cited

U.S. PATENT DOCUMENTS

| 8,514,525 | B2 | 8/2013 | Childress et al. |
| 8,711,517 | B2 | 4/2014 | Erden et al. |
| 8,786,987 | B2 | 7/2014 | Edelman et al. |
| 8,891,207 | B1 * | 11/2014 | Li ........................... G11B 5/115 360/121 |
| 9,042,058 | B1 * | 5/2015 | Li ........................ G11B 5/3912 360/316 |
| 9,042,059 | B1 * | 5/2015 | Katine ................ G11B 5/3909 360/316 |
| 9,361,910 | B2 * | 6/2016 | McKinlay .............. G11B 5/265 |
| 9,406,321 | B2 * | 8/2016 | Kief ..................... G11B 5/3964 |
| 9,431,031 | B1 * | 8/2016 | Xiao ......................... G11B 5/11 |

(Continued)

OTHER PUBLICATIONS

Gerardo A. Bertero et al., U.S. Appl. No. 14/862,895, filed Sep. 23, 2015, 45 pages.

*Primary Examiner* — Jefferson Evans
(74) *Attorney, Agent, or Firm* — Foley & Lardner LLP

(57) ABSTRACT

A magnetic read apparatus includes a first sensor, a shield layer, an insulating layer, a shield structure and a second sensor. The shield layer is between the first sensor and the insulating layer. The shield structure is in the down track direction from the insulating layer. The shield structure includes a magnetic seed structure, a shield pinning structure and a shield reference structure. The magnetic seed structure adjoins the shield pinning structure. The shield pinning structure is between the shield reference structure and the magnetic seed structure. The second sensor includes a free layer and a nonmagnetic spacer layer between the shield reference structure and the free layer. The shield reference structure is between the shield pinning structure and the nonmagnetic spacer layer. The shield pinning structure includes a pinned magnetic moment. The shield reference structure includes another magnetic moment weakly coupled with the pinned magnetic moment.

23 Claims, 10 Drawing Sheets

(56) References Cited

U.S. PATENT DOCUMENTS

| | | | |
|---|---|---|---|
| 9,437,251 B1* | 9/2016 | Rudy | G11B 33/1493 |
| 9,666,214 B1* | 5/2017 | Bertero | G11B 5/39 |
| 2005/0068683 A1* | 3/2005 | Gill | B82Y 10/00 |
| | | | 360/314 |
| 2013/0286502 A1 | 10/2013 | Erden et al. | |
| 2013/0286511 A1 | 10/2013 | Edelman et al. | |
| 2014/0055884 A1 | 2/2014 | Edelman et al. | |
| 2015/0243307 A1* | 8/2015 | Lu | G11B 5/3912 |
| | | | 360/319 |
| 2016/0005424 A1* | 1/2016 | McKinlay | G11B 5/115 |
| | | | 360/121 |

* cited by examiner

MAGNETIC READ APPARATUS HAVING MULTIPLE READ SENSORS WITH REDUCED SENSOR SPACING USABLE IN TWO-DIMENSIONAL MAGNETIC RECORDING APPLICATIONS

BACKGROUND

FIG. 1 depicts an ABS view of a conventional magnetic recording read apparatus 10. The conventional magnetic read apparatus 10 may be a part of a merged head including the read apparatus 10 and a write apparatus (not shown). Alternatively, the magnetic recording head may only include the read apparatus 10.

The read apparatus 10 includes a bottom shield 12, a first sensor 20 on a first magnetic seed layer 14, first magnetic bias structures 16, a first middle shield 30, an insulator 32, a second middle shield 34, an additional magnetic seed layer 36 for the second read sensor 40, second magnetic bias structures 44 and a second shield 46. The read sensors 20 and 40 are typically magnetic tunneling junctions (MTJs). Such read sensors 20 and 40 generally include an antiferromagnetic (AFM) pinning layer, a reference layer having its magnetic moment fixed (or pinned) in place, a nonmagnetic spacer layer and a free layer. The nonmagnetic spacer layer is between the reference and free layers. Two sensors 20 and 40 may be used for two-dimensional magnetic recording (TDMR).

Although the conventional magnetic read apparatus 10 functions, there are drawbacks. In particular, the magnetic read apparatus 10 is desired to be extended to higher areal densities. As a result, the spacing between the sensors 20 and 40 (d0) is desired to be reduced. The spacing between the shields 12 and 30 and/or 34 and 46 may also be desired to be reduced. Without such reductions in size, performance may be adversely affected. Accordingly, what is needed is a system and method for improving the performance of a magnetic recording read apparatus 10.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below uses disk drives as examples.

Figure 1:
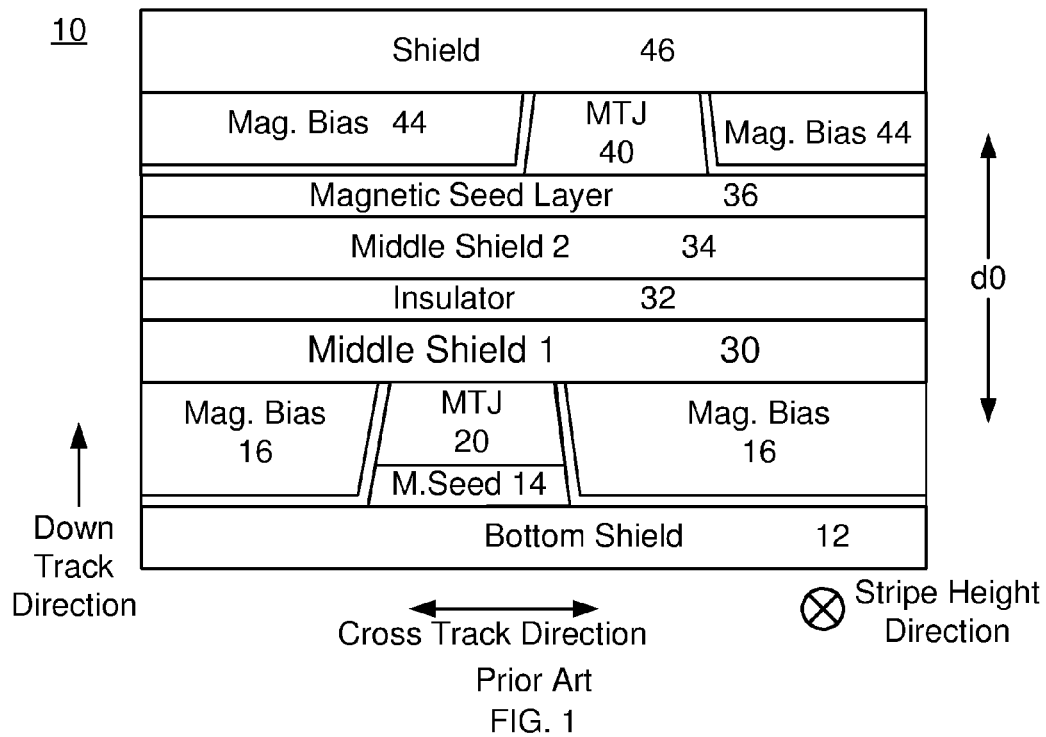
FIG. 1 depicts an ABS view of a conventional magnetic recording read apparatus.
Figure 2A:
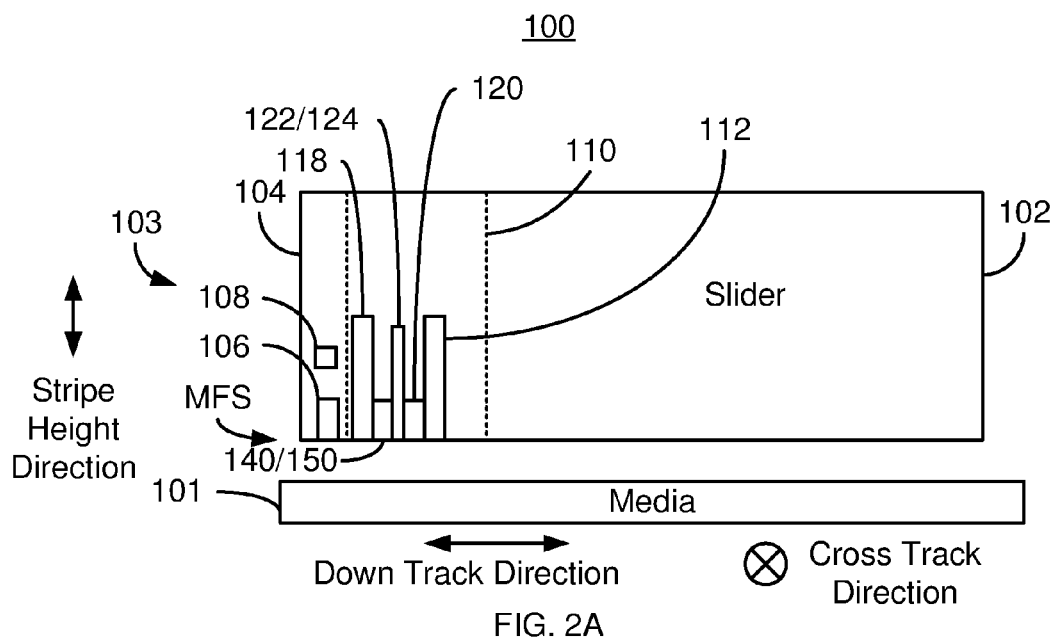
FIGS. 2A, 2B and 2C depict side, MFS and top views of an exemplary embodiment of a magnetic read apparatus.
Figure 2B:
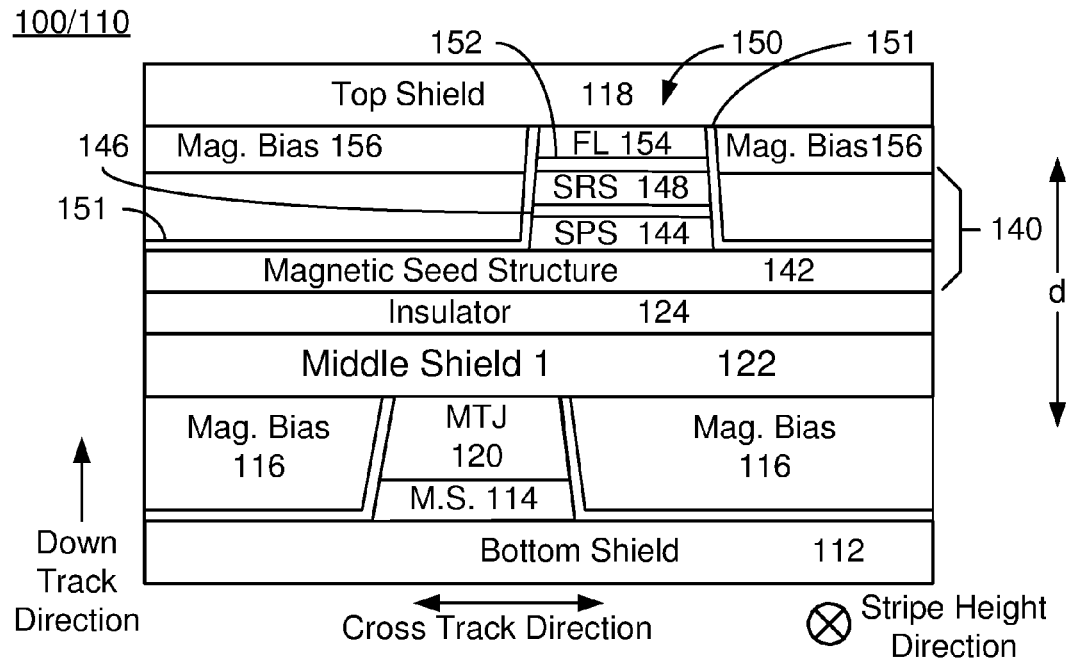
Figure 2C:
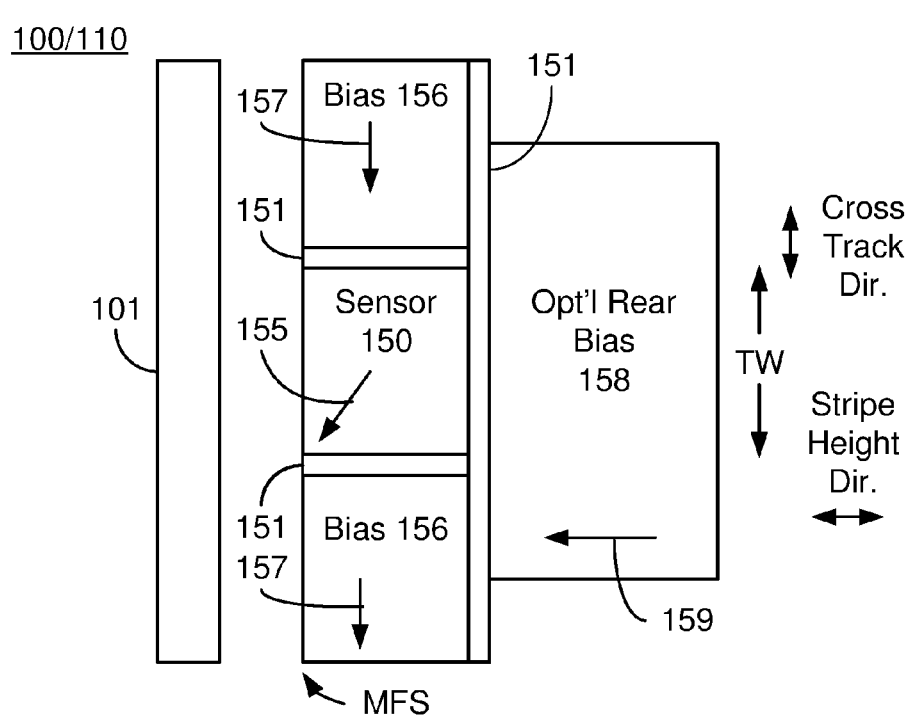

FIGS. 2A, 2B and 2C depict side, media-facing surface (MFS) and top views of an exemplary embodiment of a portion of a data storage device 100 including a read apparatus 110. For clarity, FIGS. 2A, 2B and 2C are not to scale. In the embodiment shown, the data storage device 110 is a disk drive. Therefore, the MFS may be an air-bearing surface (ABS). For simplicity not all portions of the disk drive 100 and apparatus 110 are shown. In addition, although the disk drive 100 and read apparatus 110 are depicted in the context of particular components other and/or different components may be used. For example, circuitry used to drive and control various portions of the disk drive 100 is not shown. Although not shown, the slider 102 and thus the read apparatus 110 are generally attached to a suspension (not shown). In general, the data storage device 100 includes the read apparatus 110 and a write apparatus 104 including a write pole 106 and coil(s) 108. For clarity, only the components 106 and 108 of the write apparatus 104 are shown. For simplicity, only single components are shown. However, multiples of each components and/or and their sub-components, might be used.

The data storage device 100 includes media 101, a slider 102 and a read apparatus 110. The read apparatus 110 is fabricated on the slider 102 and includes a MFS. In the embodiment shown, the MFS is proximate to the media 101 during use. The read apparatus 110 includes a bottom shield 112, a first read sensor 120, a middle shield (otherwise termed herein a shield layer) 122, an insulating layer 124, a shield structure 140, a second read sensor 150, and top shield 118. The middle shield 122 may be considered to be a first middle shield while the shield structure 140 may be considered to be a second middle shield. As discussed above, portions of the components 110, 112, 120, 122, 124, 140, 150 and/or 118 may include multiple layers. In other embodiments, different and/or additional components may be used in the read apparatus 110.

The first sensor 120 resides on a magnetic seed layer 114 and may be biased by the magnetic bias structures 116. The magnetic seed layer 114 may include a Ru layer, a NiFe layer, a CoFeB layer and a NiFe layer. Alternatively, other seed layer(s) might be used. The first read sensor 120 may be a magnetic tunneling junction (MTJ) or analogous device. Thus, the first read sensor might include a pinning layer that may be an antiferromagnetic (AFM) layer such as IrMn, a reference layer having its magnetic moment fixed by the pinning layer, a nonmagnetic tunneling barrier layer and a free layer. The magnetic moment of the free layer responds to the field from the media 101. The nonmagnetic tunneling barrier layer is between the free layer and the reference layer in the down track direction. The magnetic bias structures 116 may be hard or soft bias structures and magnetically bias the free layer of the first read sensor 120.

The bottom shield 112 may be a monolithic (single layer) shield or a multilayer. For example, the bottom shield 112 may be a layer of NiFe. The middle shield 122 may be monolithic or a multilayer. The middle shield 122 may include a NiFe layer, a CoFe layer, an IrMn layer and a Ta layer. The shields 112 and 122 may function as leads for the first read sensor 120. Although not shown, a capping layer may separate the top of the first read sensor 120 from the middle shield 122. The capping layer may also be a single layer or a multilayer.

The insulating layer 124 is in the down track direction from the middle shield 122. The insulating layer 124 electrically isolates the shield structure 140 from the middle shield 122. The middle shield 122 and bottom shield 112 may be used as leads for the first read sensor 120. The shield structure 140 and the top shield 118 may be used as leads for the second read sensor 150. Electrical isolation between the middle shield 122 and shield structure 140 allows current to be driven independently through the read sensors 120 and 150. The insulating layer 124 also adjoins, or shares an interface with, the middle shield 122.

The shield structure 140 may be considered to be a second middle shield and includes a magnetic seed structure 142, a shield pinning structure 144 and a shield reference structure 148. The shield pining structure 144 may be separated from the shield reference structure 148 by a nonmagnetic coupling layer 146. The nonmagnetic coupling layer 146 may be used to mediate the coupling between the structures 144 and 148. In some embodiments, the nonmagnetic layer is a Ru layer used to antiferromagnetically couple the structures 144 and 148. A magnetic moment of the shield reference structure 148 is weakly magnetically coupled with a magnetic moment of the shield pinning structure 144. The shield pinning structure 144 may be magnetically coupled with the magnetic seed structure 142.

The magnetic seed structure 142 is in the down track direction from the insulating layer 124 and adjoins the insulating layer 124. Thus, the insulating layer 124 shares an interface with the magnetic seed structure. The magnetic seed structure 142 provides a seed layer for subsequent layers of the shield structures 140. Thus, the magnetic seed structure 142 provide a template for growth of the desired crystal structure for subsequent layer(s). In some embodiments, the magnetic seed structure 142 includes multiple layers. For example, the magnetic seed structure 142 may include magnetic layers separated by nonmagnetic layer(s). In some embodiments, the magnetic seed structure 142 includes, in order in the down track direction, a NiFe layer, a Ru layer, a CoFeB layer, a NiFe layer and a Ru layer. The Ru layers may be used to moderate the magnetic coupling between the magnetic layers within the magnetic seed structure and between the magnetic seed structure and subsequent magnetic layers.

The shield pinning structure 144 may have its magnetic moment(s) strongly pinned, or fixed, in place. For example, the shield pinning structure 144 may include an AFM layer and a ferromagnetic layer exchanged coupled to the AFM layer. This exchange coupling is generally relatively strong. The magnetic moment(s) of the shield pinning structure 144 may not be responsive to an external field, for example a field due to a media 101. In contrast, the magnetic seed structure 142 may have magnetic moment(s) that do respond to an external magnetic field.

The shield reference structure 148 includes at least one ferromagnetic layer. In some embodiments, the shield reference structure 148 includes multiple ferromagnetic layers interleaved with and sandwiching nonmagnetic layers. In other embodiments, a single ferromagnetic layer might be used. Other configurations are possible. In some embodiments, the thickness(es) of the ferromagnetic layers are at least two nanometers and not more than ten nanometers. However, the ferromagnetic layer closest to the shield pining structure 144 may be thicker. For example, this ferromagnetic layer may have a thickness of at least three nanometers and not more than twenty nanometers. The thickness(es) of the nonmagnetic layer(s) within the shield reference structure 148 may be selected that the ferromagnetic layers are antiferromagnetically coupled via a Ruderman-Kasuya-Kittel-Yosida (RKKY) interaction.

The shield reference structure 148 may act as a reference layer for the magnetoresistance of the read sensor 150 and act as a shield. This is because the magnetic moment(s) of the shield reference structure 148 may be considered to be partially pinned and partially free. The magnetic moments of the ferromagnetic layers within the shield reference structure 148 may be strongly coupled to each other. In some embodiments, the ferromagnetic layers are antiferromagnetically coupled with a characteristic magnetic field strength of at least eight hundred and not more than two thousand Oe. For example, the shield reference structure may include two ferromagnetic layers (termed first and second reference layers) and a nonmagnetic layer between the two reference layers. The first reference layer adjoins the nonmagnetic spacer layer 152. The first reference layer may have a thickness of at least two nanometers and not more than four nanometers. The second reference layer may have a thickness of at least five nanometers and not more than seven nanometers. Either or both of these reference layers may be a multilayer.

The magnetic coupling between the shield reference structure 148 and the shield pinning structure 144 is less than the magnetic coupling between the layers within the shield reference structure 148. For example, the shield reference structure 148 may be coupled with the shield pinning structure 144 with a characteristic field strength of at least three hundred Oe and not more than one thousand five hundred Oe.

Although strongly coupled to each other, the magnetic moments of the shield reference structure 148 are not strongly fixed in place by a coupling with the shield pinning structure 144. Stated differently, the magnetic moments of the shield reference structure 148 are not completely pinned. Instead, the magnetic moments of the shield reference structure 148 are partially pinned. For example, the shield reference structure 148 has a permeability of at least five and not more than eight hundred. The magnetic moments of the shield reference structure 148 may be at least somewhat responsive to an external magnetic field. However, the magnetic moment(s) of the shield reference structure 148 are sufficiently fixed that a GMR or TMR may be developed between the free layer 154 and the shield reference structure 148.

The second read sensor 150 includes a free layer 154 and a nonmagnetic spacer layer 152. The nonmagnetic spacer layer 152 may be conductive or an insulating tunneling barrier layer, such as MgO. The free layer 154 is ferromagnetic and may include multiple layers. Thus, the only magnetic layer(s) for the second read sensor 150 may be (or be within) the free layer 154. The second read sensor 150 may thus be termed a "free layer only" read sensor 150. The difference in orientation between the magnetic moment(s) 155 of the free layer 154 and the magnetic moment of a top ferromagnetic layer of the shield reference structure 148 (not shown) gives rise to a magnetoresistance. The read sensor 150 is, therefore, a giant magnetoresistive (GMR) or tunneling magnetoresistive (TMR) read sensor in the embodiment shown. The resistance of the read sensor 150 may be used to read data. The read sensor 150 may also be configured for high density recording. Thus, in some embodiments, the track width (TW) of the read sensor 150 may be small. For example, the track width may be not more than thirty nanometers.

The side magnetic bias structures 156 may take various forms. The second read sensor 150 may be separated from the side magnetic bias structures 156 by insulator 151. In some embodiments, both the magnetic bias structures 156 are soft magnetic layers. For example, the magnetic bias structures 156 may be an alloy, multilayer or other structure that has soft magnetic properties. For example, the magnetic bias structures 156 may include CoFe and/or NiFe. In other embodiments, the magnetic bias structures 156 may be hard bias structures. For example, the magnetic bias structures 156 may be an alloy or multilayer that has a sufficiently high coercivity to have its magnetic moment substantially unchanged during operation of the magnetic read apparatus 110. In other embodiments, the magnetic bias structure 156 have another structure. The magnetic moments 157 of the magnetic bias structures 156 are shown parallel to the cross track direction. The magnetic moments 157 magnetically bias the second read sensor magnetic moment 155 in the cross track direction.

In addition, in some embodiments, an optional rear bias structure 158 may be provided. The rear bias structure 156 may include hard magnetic material(s) and/or soft magnetic materials. In some embodiments, the nonmagnetic isolator 151 separates the sensor 150 and magnetic bias structures 156 from the rear bias structure 158. The rear bias structure 158 may be used to provide a magnetic bias that is perpendicular to the MFS. In the embodiment shown in FIG. 2C, this magnetic bias is provided by magnetic moment 159 and is sufficiently large that the free layer magnetic moment 155 is canted from the cross-track direction.

The magnetic read apparatus 110 may be suitable for use at higher linear densities and for higher density TDMR. The magnetic moment(s) of the shield reference structure 148 are partially fixed, while the magnetic moment(s) of the free layer 154 respond to the magnetic field of a bit in the media 101 being read. A characteristic magnetoresistance may be developed for the second read sensor 150 depending upon the direction of the field due to the bit being read and, therefore, information stored in the bit. Thus, the magnetic read apparatus 110 is capable of reading data using a single free layer sensor 150. Because the magnetic moment(s) of the shield reference structure 148 also at least partially respond to an external field, the shield reference structure 148 may at least partially shield the free layer 154 from the magnetic field of bits not being read. Stated differently, the shield reference structure 148 and the shield structure 140 may function as a shield. Consequently, the spacing between the shields 140 and 118 may be reduced to the thickness of the free layer 154, nonmagnetic spacer layer 152 and any capping layer (not shown). The shield-to-shield spacing may be less than fifteen nanometers in some embodiments. In some embodiments, the shield-to-shield spacing may be on the order of ten nanometers or less. Thus, the shield-to-shield spacing of the magnetic read apparatus 110 may be reduced. Further, the distance, d, between the read sensors 120 and 150 may be reduced. The shield structure 140 not only functions as a shield, but also as a reference layer for the free layer only read sensor 150. Thus, various structures in the read apparatus 110 may be made thinner or omitted. In some embodiments, the distance between the top of the free layer for the read sensor 120 and the bottom of the free layer 154, d, may be less than ninety nanometers. In some embodiments, this distance, d, may be at least fifty nanometers and not more than eight nanometers. For example, this distance may be seventy-eight nanometers or less. Because the distance between the read sensors 120 and 150 may be reduced, the misalignment between the sensors 120 and 150 at skew may also be decreased. As a result, the magnetic read apparatus 110 may be suitable for higher density TDMR applications. Consequently, the magnetic read apparatus 110 may be suitable for high linear and/or areal density magnetic recording applications as well as TDMR.

Figure 3:
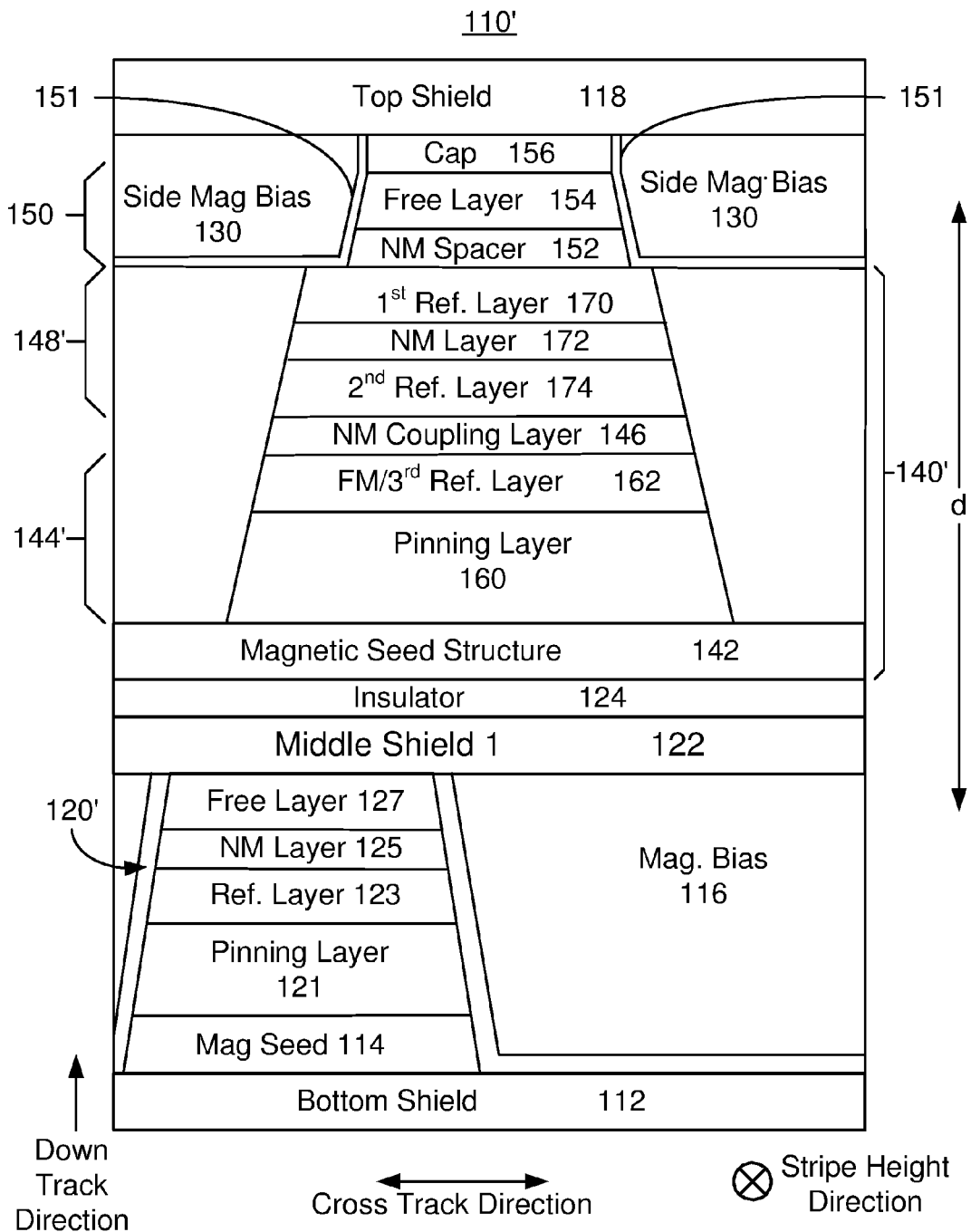
FIG. 3 depicts an MFS view of another exemplary embodiment of a magnetic read apparatus.

FIG. 3 depicts an MFS view of an exemplary embodiment of a portion of a read apparatus 110'. For clarity, FIG. 3 is not to scale. For simplicity not all portions of the read apparatus 110' are shown. In addition, although the read apparatus 110' is depicted in the context of particular components other and/or different components may be used. For simplicity, only single components are shown. However, multiples of each components and/or and their sub-components, might be used. The read apparatus 110' is analogous to the read apparatus 110. Consequently, similar components have analogous labels.

The read apparatus 110' includes a bottom shield 112, a first read sensor 120', a middle shield 122, an insulating layer 124, a shield structure 140', a second read sensor 150', and a top shield 118 that are analogous to the read apparatus 110, the bottom shield 112, the first read sensor 120, a middle shield 122, the insulating layer 124, the shield structure 140, the second read sensor 150, and the top shield 118, respectively. As discussed above, portions of the components 110', 112, 120', 122, 124, 140', 150' and/or 118 may include multiple layers. In other embodiments, different and/or additional components may be used in the read apparatus 110.

The first sensor 120' resides on a magnetic seed layer 114 and may be biased by the magnetic bias structures 116. The magnetic seed layer 114 may include a Ru layer, a NiFe layer, a CoFeB layer and a NiFe layer. The first read sensor 120' is an MTJ. Thus, the first read sensor 120' includes a pinning layer 121 that may be an AFM layer such as IrMn, a reference layer 123 having its magnetic moment fixed by the pinning layer 121, a nonmagnetic tunneling barrier layer 125 and a free layer 127. The magnetic moment of the free layer 127 responds to the field from the media 101. The nonmagnetic tunneling barrier layer 125 is between the free layer 127 and the reference layer 123 in the down track direction. The magnetic bias structures 116 may be hard or soft bias structures and magnetically bias the free layer of the first read sensor 120'.

The middle shield 122 and bottom shield 112 shield the free layer 127 from the magnetic field from portions of the media not being read. In some embodiments, the middle shield 122 is nominally twenty nanometers thick or less and may include a first soft magnetic layer, a second soft magnetic layer, an AFM layer and a nonmagnetic layer. The insulating layer 124 is in the down track direction from the middle shield 122. The insulating layer 124 electrically isolates the shield structure 140 from the middle shield 122. The insulating layer 124 also adjoins, or shares an interface with, the middle shield 122. For example, the insulating layer 124 may be an aluminum oxide layer. In some embodiments, the insulating layer is nominally ten nanometers thick.

The shield structure 140' includes a magnetic seed structure 142, a shield pinning structure 144' and a shield reference structure 148'. The shield pining structure 144' may be separated from the shield reference structure 148' by a nonmagnetic coupling layer 146. The nonmagnetic coupling layer 146 may be used to mediate the coupling between the structures 144 and 148 and may be a Ru layer. In some embodiments, the nonmagnetic coupling layer 146 is configured such that the structures 144 and 148 are AFM coupled.

The magnetic seed structure 142 is analogous to the magnetic seed structure 142 shown in FIGS. 2A-2C. Thus, the magnetic seed structure 142 may include multiple layers and shares an interface with the insulating layer 124. The magnetic seed structure 142 provides a seed layer for subsequent layers of the shield structures 140.

The shield pinning structure 144' includes a pinning layer 160 and a ferromagnetic layer 162, also termed a third reference layer 162. The third reference layer 162 has its magnetic moment(s) strongly pinned, or fixed, in place by the pinning layer 160. For example, the pinning layer 160 may be an AFM layer and a ferromagnetic layer exchanged coupled to the AFM layer, such as IrMn. This exchange coupling is generally relatively strong. The third reference layer 162 may be a multilayer. For example, the third reference layer 162 may include a CoFe layer, a CoFeB layer, a NiFe layer and a CoFe layer. In some embodiments, the third reference layer 162 is at least two nanometers thick and not more than four nanometers thick. The magnetic moment(s) of the third reference layer 162 is fired by the pinning layer 160 and thus may not be responsive to an external field.

The shield reference structure 148' includes ferromagnetic layers 170 and 174 separated by a nonmagnetic layer 172. The ferromagnetic layers 170 and 174 may be termed a first reference layer 170 and a second reference layer 174, respectively. In some embodiments, the thickness of the first reference layer 170 may be at least two nanometers and not more than four nanometers. In some embodiments, the thickness of the second reference layer 174 is at least five nanometers and not more than seven nanometers. The reference layers 170 and 174 may also be multilayers. For example, the first reference layer may include a CoFe layer, a Ta layer, a CoFeB layer, a Pt layer and a CoFe layer. The second reference layer 175 may include a CoFe layer, a CoFeB layer, a NiFe layer and another CoFe layer. The thickness of the nonmagnetic layer 172 is selected such that the reference layers 170 and 174 are antiferromagnetically coupled via an RKKY interaction. The magnetic moments of the reference layers 170 and 174 are strongly coupled. However, the shield reference structure 148' may be at least somewhat responsive to an external magnetic field. The magnetic moment(s) of the shield reference structure 148' are still sufficiently fixed that a GMR or TMR may be developed between the free layer 154 and the first reference layer 170.

The nonmagnetic coupling layer 146 may include Ru and has a thickness such that the reference layers 162 and 174 are weakly antiferromagnetically coupled. For example, the nonmagnetic coupling layer may be at least seven and not more than nine Angstroms thick. Thus, a magnetic moment of the shield reference structure 148' is weakly magnetically coupled with a magnetic moment of the shield pinning structure 144'. More specifically the magnetic coupling between the second reference layer 174 and the third reference layer 162 is less than the magnetic coupling between the first reference layer 170 and the second reference layer 174. For example, the second reference layer 174 may be coupled with the third reference layer 162 with a characteristic field strength of at least three hundred Oe and not more than one thousand five hundred Oe. Thus, the magnetic moments of the shield reference layer 148' are not completely pinned. The shield reference structure 148' may have a permeability of at least five and not more than eight hundred.

The second read sensor 150 includes a free layer 154 and a nonmagnetic spacer layer 152 and is analogous to the read sensor 150 having layers 154 and 153, respectively, depicted in FIGS. 2A-2C. The second read sensor 150 may thus be a "free layer only" read sensor 150. The shield reference structure 148' may act as a reference layer for the magnetoresistance of the read sensor 150 and act as a shield. Thus, the shield reference structure 148' and sensor 150 function in an analogous manner as described above.

The side magnetic bias structures 156 are analogous to the magnetic bias structures 156 shown in FIGS. 2A-2C. Thus, these bias structures 156 may take various forms. Although not shown in FIG. 3, an optional rear bias structure analogous to the rear bias structure 158 may be provided.

The magnetic read apparatus 110' may be suitable for use at higher linear densities and for higher density TDMR. The magnetic moments of the first reference layer 170 and the second reference layer 174 of the shield reference structure 148' are partially fixed. The magnetic moment(s) of the free layer 154 respond to the magnetic field of a bit in the media (not shown in FIG. 3) being read. A characteristic magnetoresistance may be developed for the second read sensor 150 depending upon the information stored in the bit. The magnetic moment(s) of the reference layers 170 and 174 in the shield reference structure 148' may at least partially respond to an external field. Thus, the shield reference structure 148' may at least partially shield the free layer 154 from the magnetic field of bits not being read. The spacing between the shields 140' and 118 may be reduced to the thickness of the free layer 154, nonmagnetic spacer layer 152 and any capping layer (not shown). Further, the distance, d, between the read sensors 120' and 150 may be reduced. The shield structure 140 not only functions as a shield, but also as a reference layer for the free layer only read sensor 150. Thus, various structures in the read apparatus 110 may be made thinner or omitted. In some embodiments, the distance between the top of the free layer for the read sensor 120' and the bottom of the free layer 154, d, may be less than ninety nanometers. In some embodiments, this distance, d, may be at least fifty nanometers and not more than eight nanometers. Because the distance between the read sensors 120' and 150 may be reduced, the misalignment between the sensors 120' and 150 at skew may also be decreased. As a result, the magnetic read apparatus 110' may be suitable for higher density TDMR applications. Consequently, the magnetic read apparatus 110' may be suitable for high linear and/or areal density magnetic recording applications as well as TDMR.

Figure 4A:
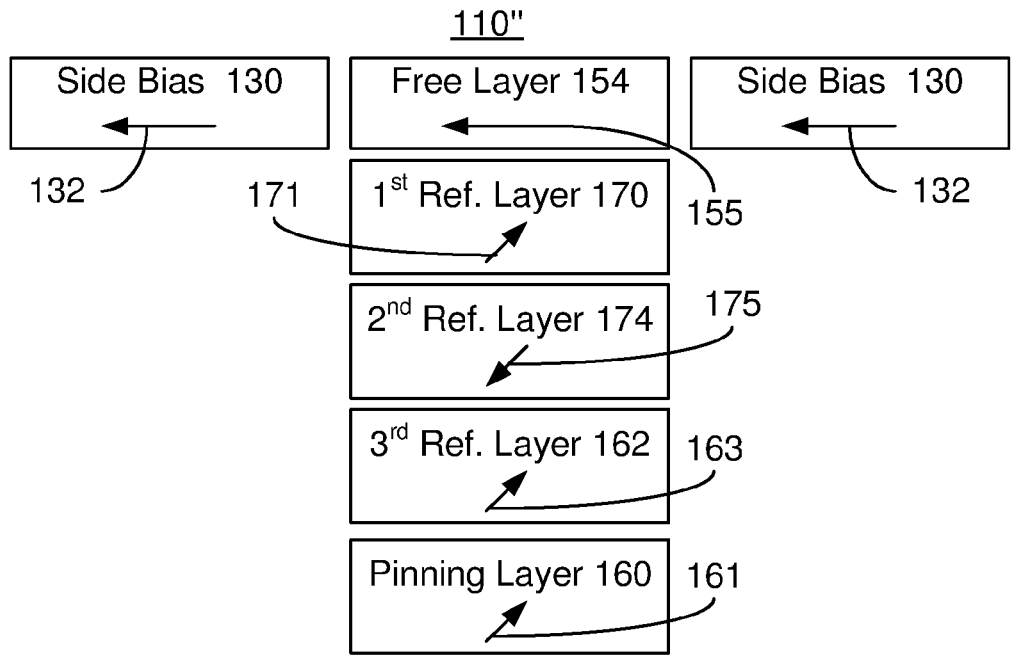
FIGS. 4A-4C depict various magnetic configurations of another exemplary embodiment of a magnetic read apparatus.
Figure 4B:
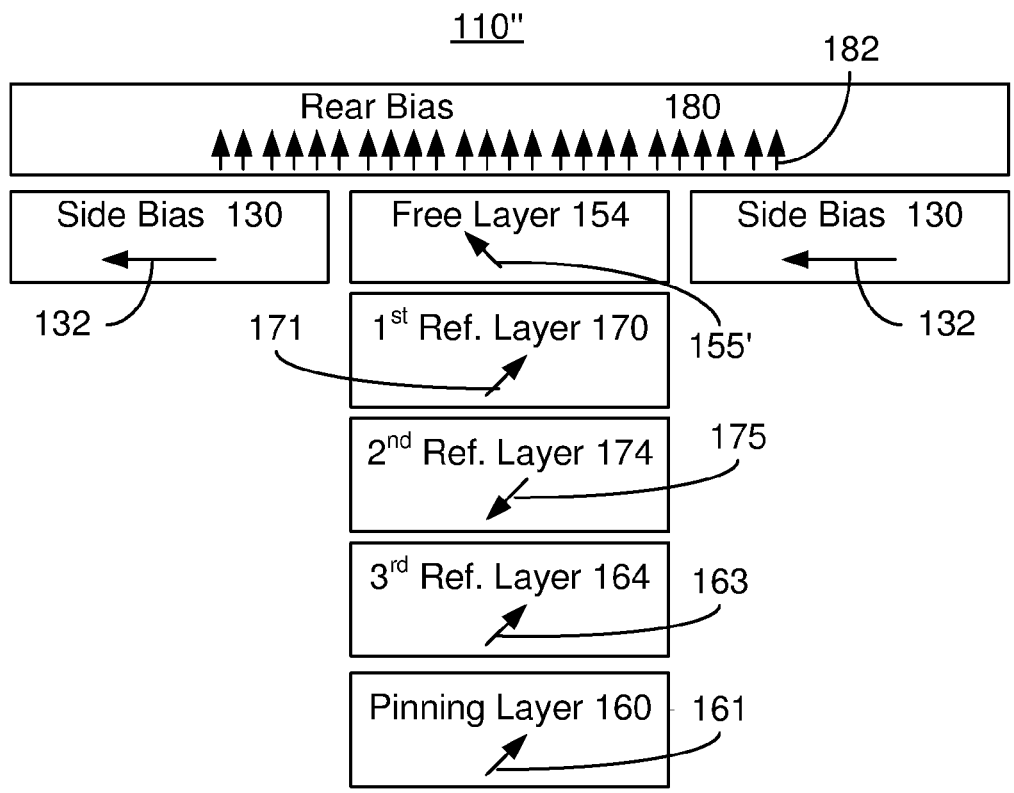
Figure 4C:
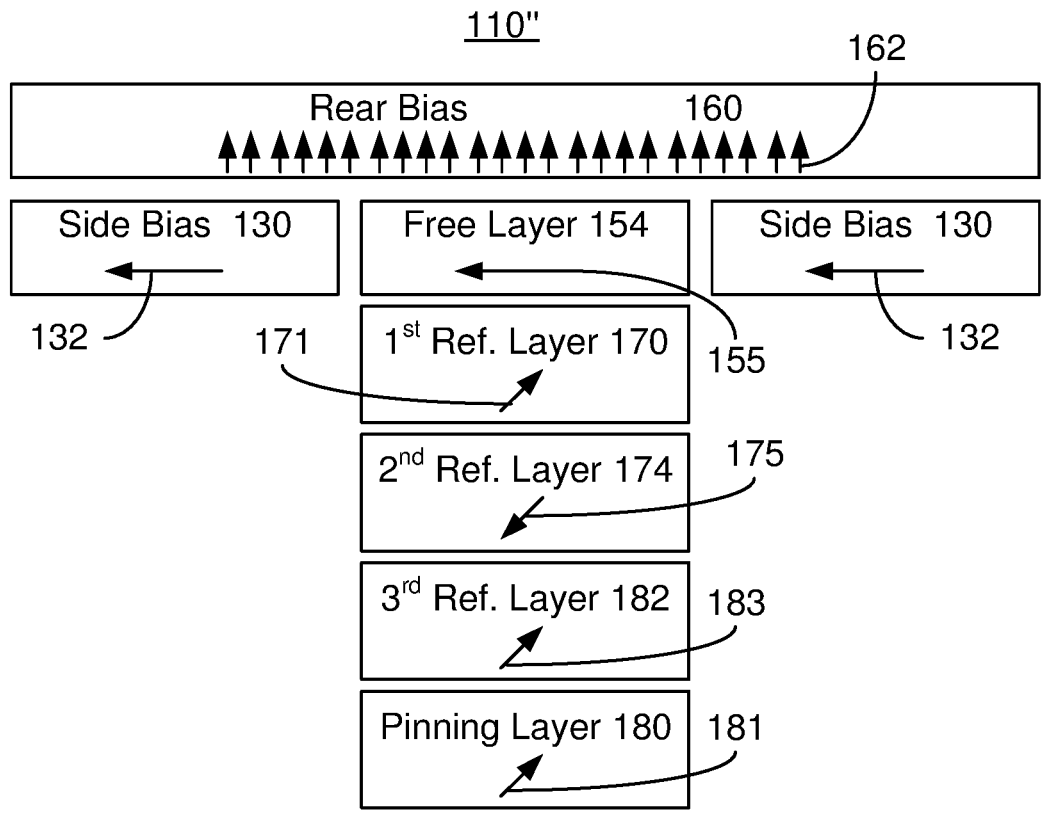

FIGS. 4A-4C depict various views of exemplary embodiments of a portion of a magnetic read apparatus 110". For clarity, FIGS. 4A-4C are not to scale. FIGS. 4A-4C depict embodiments of the magnetic apparatus 110" in the absence of an external field. FIG. 4A depicts the magnetic layers of the magnetic read apparatus 110" if no rear magnetic bias is used. FIG. 4B depicts the magnetic layers of the magnetic read apparatus 100" in the presence of a rear magnetic bias. FIG. 4C depicts another embodiment of the magnetic layers of the magnetic read apparatus 110" if a different magnetic bias is used. The magnetic read apparatus 110" is analogous to the magnetic read apparatuses 110 and/or 110'. Consequently, analogous components are labeled similarly. For clarity, only the free layer 154, side bias structures 130, reference layers 162, 170 and 174, pinning layer 160 and, in some embodiments, rear bias structure 180 are shown.

FIG. 4A depicts one embodiment of the magnetic layers of the magnetic read apparatus 110" in the absence of a rear bias structure. The free layer 154 has a magnetic moment 155 that is magnetically biased by the moments 132 of the side bias structures 130. Thus, the free layer magnetic moment 155 is in the cross-track direction. As can also be seen in FIG. 4A, the magnetic moment 163 of the reference layer 162 is coupled to the direction of orientation some of the magnetic moments 161 of the pinning layer 160. The magnetic moments 171 and 175 of the reference layers 170 and 174 are antiferromagnetically coupled. The moment 175 of the layers 174 is weakly coupled with the moment 163 of the layer 162.

FIG. 4B depicts one embodiment of the magnetic layers of the magnetic read apparatus 110" in the presence of a rear bias structure 180 having magnetic moments 182. The free layer 154 has a magnetic moment 155' that is magnetically biased by the moments 132 of the side bias structures 130 and by the magnetic moment 182 of the rear bias structure 180. In the embodiment shown, the magnetic bias due to the rear bias structure 180 is sufficiently strong that the magnetic moment 155' is canted from the cross-track direction. As can also be seen in FIG. 4B, the magnetic moment 163 of the ferromagnetic layer 162 is coupled to the direction of orientation some of the magnetic moments 161 of the pinning layer 160. The magnetic moments 171 and 175 of the layers 170 and 174 are antiferromagnetically coupled. The moment 175 of the layers 174 is weakly coupled with the moment 163 of the layer 162.

FIG. 4C depicts another embodiment of the magnetic layers of the magnetic read apparatus 110" in the presence of a rear bias structure 180 having magnetic moments 182. The free layer 154 has a magnetic moment 155 that is magnetically biased by the moments 132 of the side bias structures 130 and by the magnetic moment 182 of the rear bias structure 180. In the embodiment shown, the magnetic bias due to the rear bias structure 180 is sufficiently weak that the magnetic moment 155 remains in the cross-track direction. As can also be seen in FIG. 4C, the magnetic moment 163 of the ferromagnetic layer 162 is coupled to the direction of orientation of the magnetic moments 161 of the pinning layer 160. The magnetic moments 171 and 175 of the layers 170 and 174 are antiferromagnetically coupled. The moment 175 of the layers 174 is weakly coupled with the moment 163 of the layer 162.

Thus, the free layer 154 of the read sensor 150/150' may be biased by the side bias structures 130 and, in some embodiments, the rear bias 158/180. As a result, the free layer 154 may be biased in the desired direction. Consequently, the read sensor 150 and magnetic read apparatus 110 and/or 110' may function as desired.

Figure 5:
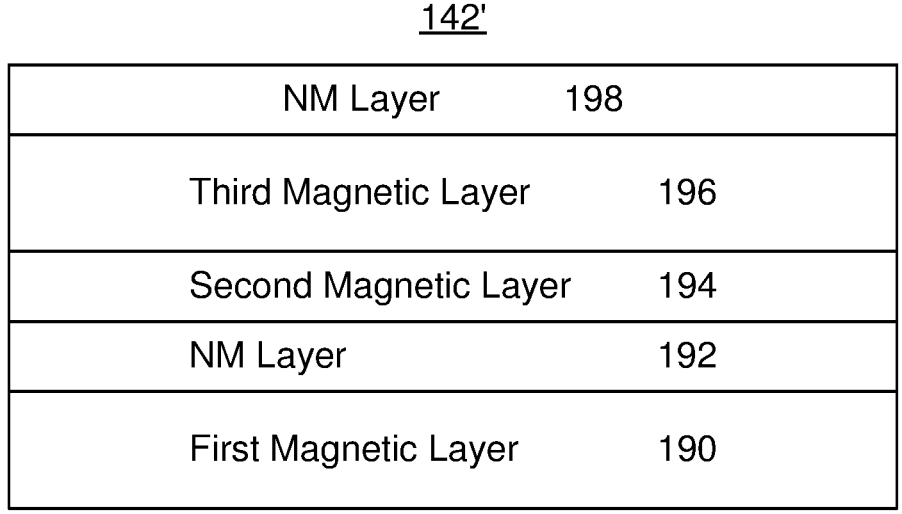
FIG. 5 depicts an exemplary embodiment of a magnetic seed structure.

FIG. 5 depicts an exemplary embodiment of a magnetic seed structure 142'. The magnetic seed layer 142' is analogous to the magnetic seed structure 142 depicted in FIGS. 2B, 2C and 3. Thus, the magnetic seed structure 142' provides a seed layer, or growth template, for subsequent layers of the shield structure 140/140'.

In the embodiment shown, the magnetic seed structure 142' includes a first magnetic layer 190, a nonmagnetic layer 192, a second magnetic layer 194, a third magnetic layer 196 and an additional nonmagnetic layer 198. The nonmagnetic layers 192 and 198 may be metallic layers. The first magnetic layer 190 may adjoin the insulating layer 142 and the nonmagnetic layer 198 adjoins the pinning structure 144/144'. The first magnetic layer 190 may be NiFe. For example, $Ni_{95}Fe_5$ may be used. In some embodiments, the first magnetic layer 190 is at least forty Angstroms and not more than sixty Angstroms thick. The first nonmagnetic layer 192 may be Ru. In some embodiments, the Ru layer 192 may be at least ten Angstroms thick and not more than thirty Angstroms thick. The second magnetic layer 194 may be a CoFeB layer having a thickness of at least ten Angstroms and not more than thirty Angstroms. For example, the $Co_{40}Fe_{40}B_{20}$ might be used. The third magnetic layer 196 may be a NiFe layer. For example, a $Ni_{50}Fe_{50}$ layer having a thickness of at least forty Angstroms and not more than sixty Angstroms might be used. The second nonmagnetic layer 198 may be a Ru layer that is at least five Angstroms thick and not more than fifteen Angstroms thick.

The magnetic seed structure 142' may improve the ability of the shield structure 140/140' to function as a shield. For example, use of the second nonmagnetic layer 198 may break the domain structure within the shield structure 140/140'. The shield structure 140/140' may have a higher permeability. Thus, the shield structure 140/140' may better function as a shield in addition to functioning as a pinned layer for the free layer 154.

Figure 6:
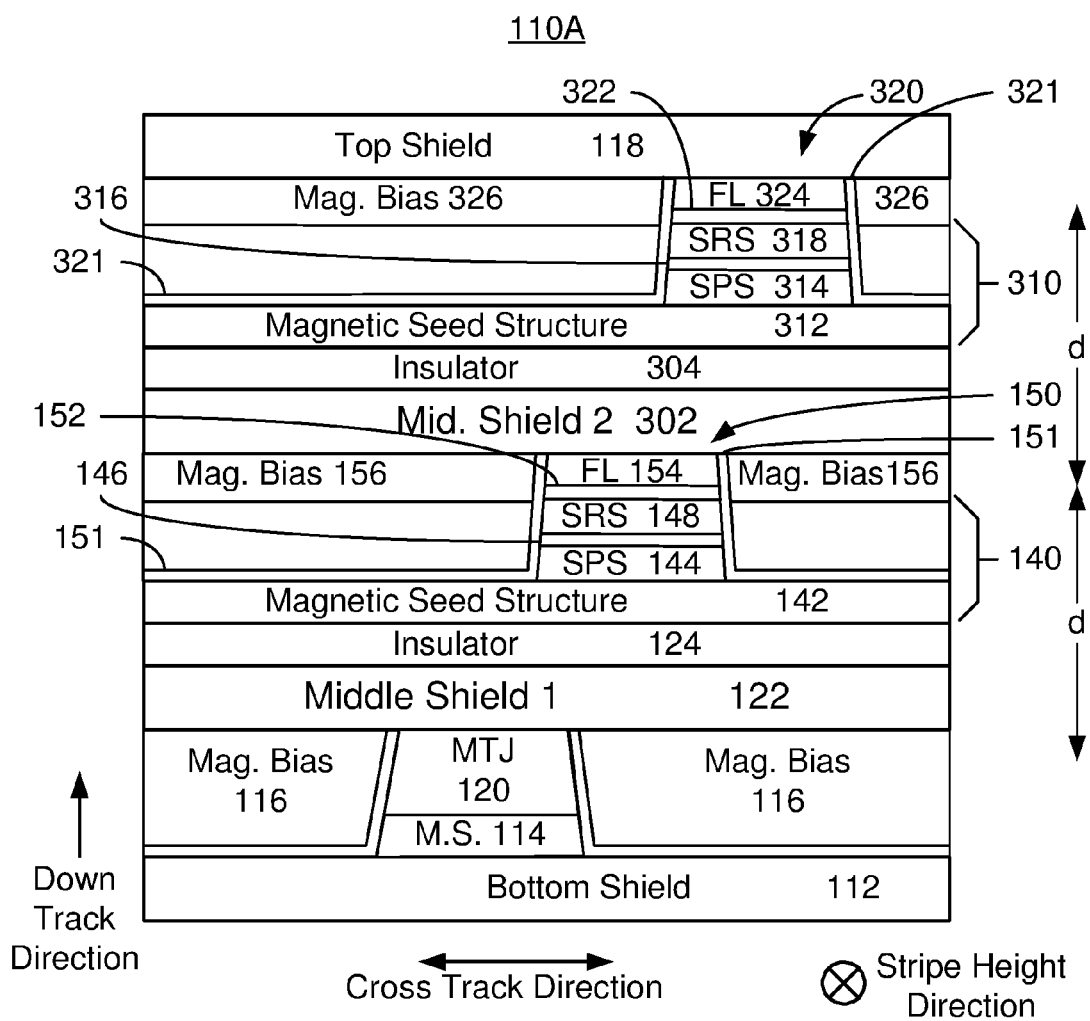
FIG. 6 is an MFS view of another exemplary embodiment of a magnetic read apparatus.

FIG. 6 depicts an MFS view of an exemplary embodiment of a portion of a read apparatus 110A. For clarity, FIG. 6 is not to scale. For simplicity not all portions of the read apparatus 110A are shown. In addition, although the read apparatus 110A is depicted in the context of particular components other and/or different components may be used. For simplicity, only single components are shown. However, multiples of each components and/or and their sub-components, might be used. The read apparatus 110A is analogous to the read apparatus(es) 110, 110' and/or 110". Consequently, similar components have analogous labels.

The read apparatus 110A includes a bottom shield 112, a first read sensor 120, a middle shield 122, an insulating layer 124, a shield structure 140, a second read sensor 150 having a free layer 154 and a nonmagnetic spacer layer 152, and a top shield 118 that are analogous to the read apparatus 110/110'/110", the bottom shield 112, the first read sensor 120/120', a middle shield 122, the insulating layer 124, the shield structure 140/140', the second read sensor 150 having a free layer 154 and a nonmagnetic spacer layer 152, and the top shield 118, respectively. The shield structure 140 includes a magnetic seed structure 142, a shield pinning structure 144, an optional nonmagnetic coupling layer 146 and a shield reference structure 148 analogous to the structures 142/142', 144/144', 146 and 148/148'. Magnetic bias structures 156 are analogous to the magnetic bias structure 156 described above. As discussed above, portions of the components 110A, 112, 120', 122, 124, 140', 150' and/or 118 may include multiple layers. In other embodiments, different and/or additional components may be used in the read apparatus 110A.

In the embodiment shown, three read sensors 120, 140 and 320 are used. In other embodiments, another number of read sensors might be used. Stated differently, a magnetic read apparatus 110, 110', 110", 110A and/or 110B may have two or more read sensors. Thus, the magnetic read apparatus 110A includes an additional middle shield layer 302, an insulating layer 304, a shield structure 310, a read sensor 320 and magnetic bias structure 326 that may be analogous to the middle shield 122, insulating layer 124, shield structure 140/140', read sensor 150, and magnetic bias structures 156, respectively. Thus, the magnetic read apparatus 110A includes two free layer-only sensors 150 and 320 as well as two shield structures 140/140' and 310. Thus, the read sensors 150 and 320 may be separated by a smaller distance, d.

The magnetic read apparatus 110A may be suitable for use at higher linear densities and for higher density TDMR. As discussed above, the shield-to shield spacing for the read sensors 140 and 310 may be smaller. In addition, the distance between the read sensors 120 and 140 and the distance between the read sensors 140 and 320 may be reduced as described above. Because the distance between the read sensors 120' and 150 may be reduced, the misalignment between the sensors 120' and 150 at skew may also be decreased. As a result, the magnetic read apparatus 110A may be suitable for higher density TDMR applications. Consequently, the magnetic read apparatus 110A may be suitable for high linear and/or areal density magnetic recording applications as well as TDMR.

Figure 7:
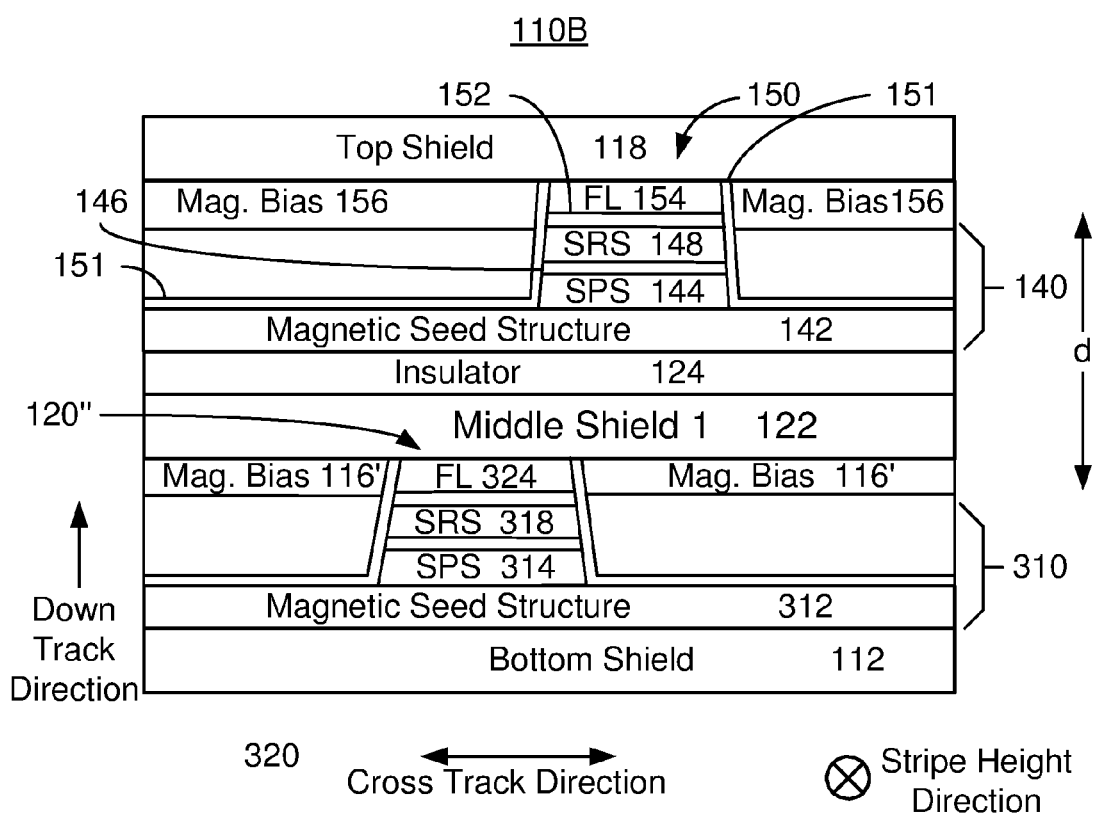
FIG. 7 is an MFS view of another exemplary embodiment of a magnetic read apparatus.

FIG. 7 depicts an MFS view of an exemplary embodiment of a portion of a read apparatus 110B. For clarity, FIG. 7 is not to scale. For simplicity not all portions of the read apparatus 110B are shown. In addition, although the read apparatus 110B is depicted in the context of particular components other and/or different components may be used. For simplicity, only single components are shown. However, multiples of each components and/or and their sub-components, might be used. The read apparatus 110B is analogous to the read apparatus(es) 110, 110', 110" and/or 110A. Consequently, similar components have analogous labels.

The read apparatus 110B includes a bottom shield 112, a first read sensor 120", a middle shield 122, an insulating layer 124, a shield structure 140, a second read sensor 150 having a free layer 154 and a nonmagnetic spacer layer 152, and a top shield 118 that are analogous to the read apparatus 110/110'/110"/110A, the bottom shield 112, the first read sensor 120/120', a middle shield 122, the insulating layer 124, the shield structure 140/140', the second read sensor 150 having a free layer 154 and a nonmagnetic spacer layer 152, and the top shield 118, respectively. The shield structure 140 includes a magnetic seed structure 142, a shield pinning structure 144, an optional nonmagnetic coupling layer 146 and a shield reference structure 148 analogous to the structures 142/142', 144/144', 146 and 148/148'. Magnetic bias structures 156 are analogous to the magnetic bias structure 156 described above. As discussed above, portions of the components 110A, 112, 120', 122, 124, 140', 150' and/or 118 may include multiple layers. In other embodiments, different and/or additional components may be used in the read apparatus 110A.

In the embodiment shown, two read sensors 120" and 320 are used. The MTJ 120 has been replace by free layer-only sensor 130, though other read sensors might be used. Because the read sensor 310 is a free layer only sensor, the magnetic bias structures 116' have been modified to bias the free layer 314, but not the shield structure 310. The magnetic read apparatus 120B also includes shield structure 310 including magnetic seed structure 312, shield pinning structure 314 nonmagnetic coupling layer 316 and shield reference structure 318 analogous to those descried above. Thus, the magnetic read apparatus 110B includes two free layer-only sensors 150 and 320 as well as two shield structures 140/140' and 310. Thus, the read sensors 150 and 320 may be separated by a smaller distance, d.

The magnetic read apparatus 110B may be suitable for use at higher linear densities and for higher density TDMR. As discussed above, the shield-to shield spacing for the read sensors 140 and 120' may be smaller. In addition, the distance between the read sensors 120' and 140 may be reduced as described above. Because the distance between the read sensors 120' and 150 may be reduced, the misalignment between the sensors 120' and 150 at skew may also be decreased. As a result, the magnetic read apparatus 110B may be suitable for higher density TDMR applications. Consequently, the magnetic read apparatus 110B may be suitable for high linear and/or areal density magnetic recording applications as well as TDMR.

Various features of the magnetic recording apparatuses 110, 110', 110", 110A and 110B' have been depicted and described herein. One of ordinary skill in the art will recognize that these features may be combined in other manners not explicitly disclosed herein.

Figure 8:
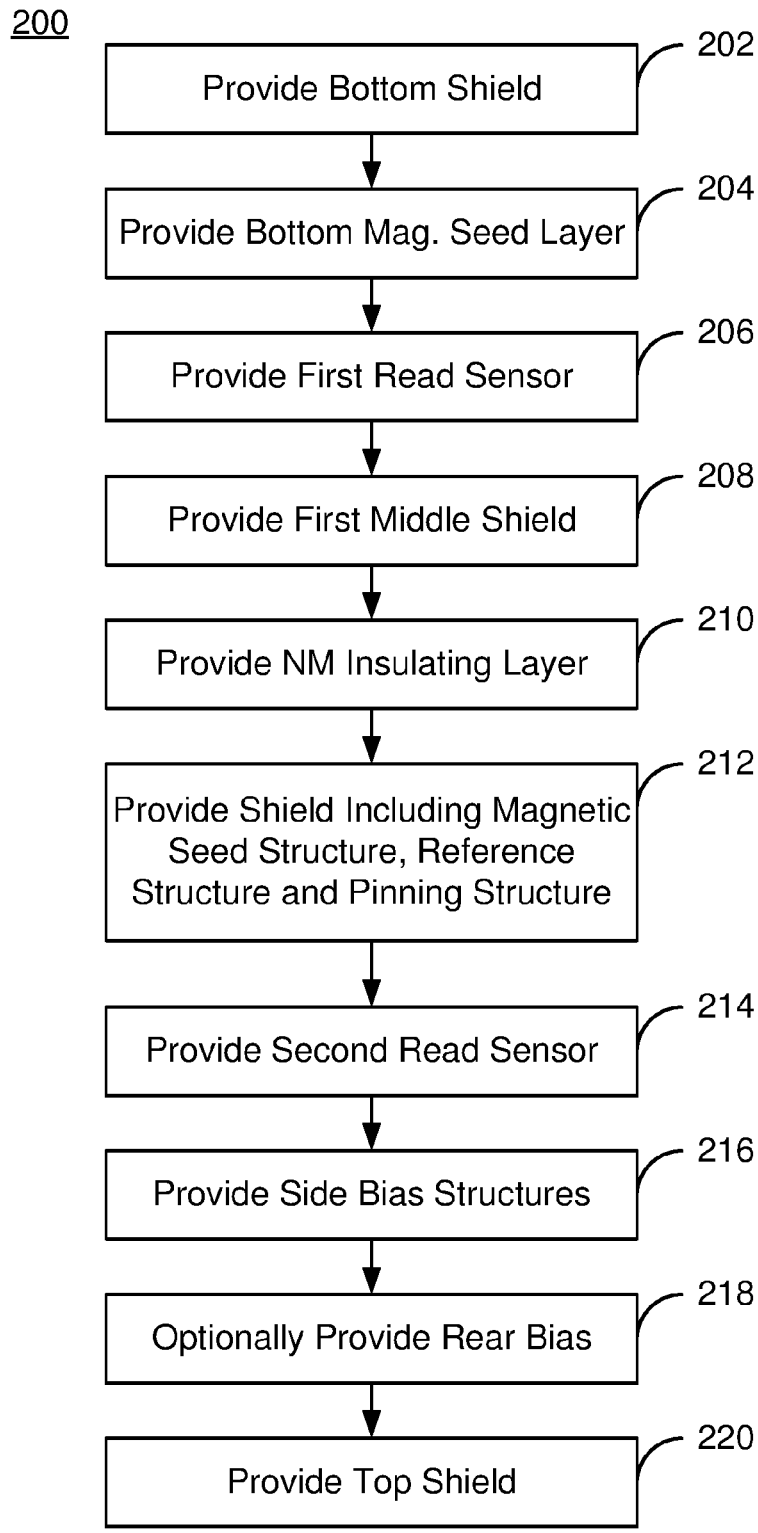
FIG. 8 is a flow chart depicting an exemplary embodiment of a method for providing magnetic read apparatus.

FIG. 8 depicts an exemplary embodiment of a method 200 for providing a magnetic read apparatus such as the magnetic read apparatus 110. For simplicity, some steps may be omitted, interleaved, combined and/or include substeps. The method 200 is thus described in the context of providing the magnetic read apparatus 110. The method 200 may also be used to fabricate other magnetic recording apparatuses including but not limited to the magnetic read apparatuses 110', 150 and/or 150'. The method 200 is described in the context of a single device but may be used to fabricate multiple magnetic storage apparatuses at substantially the same time. The method 200 is also described in the context of particular layers. A particular layer may include multiple materials and/or multiple sub-layers. The method 200 also may start after formation of other portions of the magnetic recording apparatus.

The bottom shield 112 is provided, via step 202. This step may include depositing a monolithic shield or providing a multilayer shield. In some embodiments, the shield 112 may be an AFC coupled shield.

The bottom magnetic seed layer 114 may optionally be provided, via step 204. Step 204 may include depositing multiple layers. The first read sensor 120 is provided, via step 206. Step 206 may include full film depositing the layers for an MTJ or analogous sensor, then ion milling or otherwise defining the edges of the sensor. The magnetic bias structures 116 and any insulating or other layers may also be provided.

The middle shield 122 may be provided, via step 208. Thus, a shield layer is formed. In some embodiments, the middle shield/shield layer may be a monolithic shield. In other embodiments, the middle shield/shield layer 122 may be a multilayer.

An insulating layer 124 is provided on the middle shield/shield layer 122, via step 210. In some embodiments, the insulating layer 124 provided in step 210 is nonmagnetic. For example, step 210 may include depositing an aluminum oxide layer. The insulator deposited in step 210 is sufficiently thick to electrically insulate the middle shield/shield layer 122 from subsequent layers.

A shield structure 140, or second middle shield, is provided, via step 212. Step 212 may include fabricating the magnetic seed structure 142, the pinning structure 144, the nonmagnetic layer 146 and the reference structure 148. Edges of the shield structure 140 may also be defined in step 212.

The second read sensor 150 is fabricated, via step 214. Thus, step 214 includes depositing the nonmagnetic layer 152 and the free layer 154 as well as defining the edges of the layers 152 and 154. The magnetic side bias structures 130 may optionally be provided, via step 216. The rear bias structure 158 may also be formed, via step 218.

The top shield 118 may also be formed, via step 220. This step may include depositing a monolithic shield or providing a multilayer shield. In some embodiments, the shield 118 may be an AFC coupled shield.

Using the method 200, the magnetic read apparatus 110 and/or 110' may be provided. Thus, a read apparatus that has a reduced shield-to-shield spacing and a reduced spacing between sensors may be provided. Thus, performance of the read apparatus 110/110', particularly for TDMR, may be improved.

Figure 9:
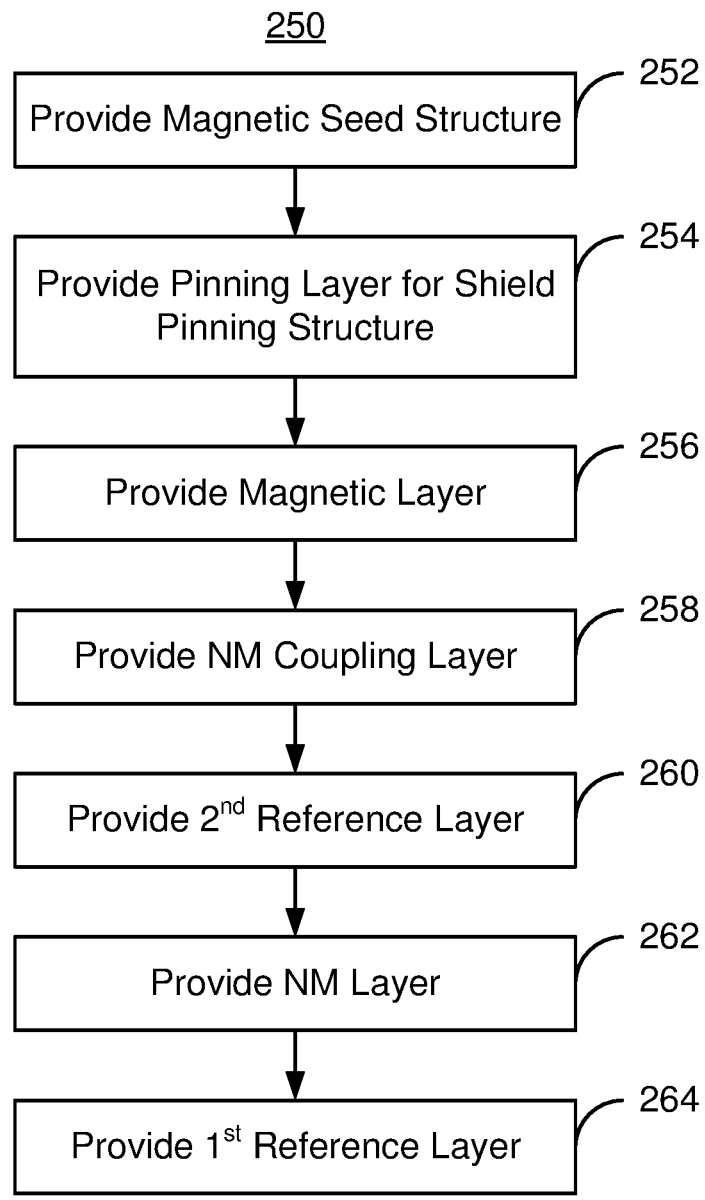
FIG. 9 is a flow chart depicting an exemplary embodiment of a method for providing a shield structure of a magnetic recording apparatus.

FIG. 9 depicts an exemplary embodiment of a method 250 for providing a shield structure in a magnetic read apparatus such as the magnetic read apparatus 110'. For simplicity, some steps may be omitted, interleaved, combined and/or include substeps. The method 250 is thus described in the context of providing the shield structure 140' of the magnetic read apparatus 110'. The method 250 may also be used to fabricate other shield structures including but not limited to the shield structure 140. The method 250 is described in the context of a single device but may be used to fabricate multiple magnetic storage apparatuses at substantially the same time. The method 250 is also described in the context of particular layers. A particular layer may include multiple materials and/or multiple sub-layers. The method 250 also may start after formation of other portions of the magnetic recording apparatus. For example, the method 250 may commence after the insulating layer 124 is formed.

The magnetic seed structure 142 is provided, via step 252. Step 252 may include depositing multiple layers for the magnetic seed structure.

Steps 254 and 256 form the pinning structure 142'. Thus, the pinning layer 160 is provided, via step 254. The pinning layer 160 adjoins the magnetic seed structure 142. The third reference layer 162 is provided, via step 256. In some embodiments, step 256 is performed such that the third reference layer 162 adjoins the pinning layer 160. Step 255 may include depositing multiple layers. The nonmagnetic coupling layer 144 is provided, via step 258. Step 258 includes depositing the desired nonmagnetic material(s) such as Ru to a particular thickness. The thickness of the nonmagnetic coupling layer 144 is set such that the reference layers 162 and 174 are weakly magnetically coupled as described above.

Steps 260 through 264 are used to fabricate the reference structure 148'. Thus, the second reference layer 174 is provided, via step 260. Step 260 may include depositing multiple magnetic layers. The nonmagnetic layer 172 is provided, via step 262. Step 262 includes depositing the desired nonmagnetic material(s) such as Ru to a thickness desired for AFM coupling between the reference layers 170 and 174. The first reference layer 174 is provided. Step 174 may include depositing multiple magnetic layers. Further, the edges of the layers 160, 162, 146, 174, 172 and 170 may be defined to be narrower than the middle shield 122. Thus, the shield structures 144' and 148' and the nonmagnetic coupling layer 146 may be as shown in FIG. 3.

Using the method 250, the shield structure 140' and/or 140 may be provided. Thus, a read apparatus that has a reduced shield-to-shield spacing and a reduced spacing between sensors may be provided. Thus, performance of the read apparatus 110/110', particularly for TDMR, may be improved.

Figure 10:
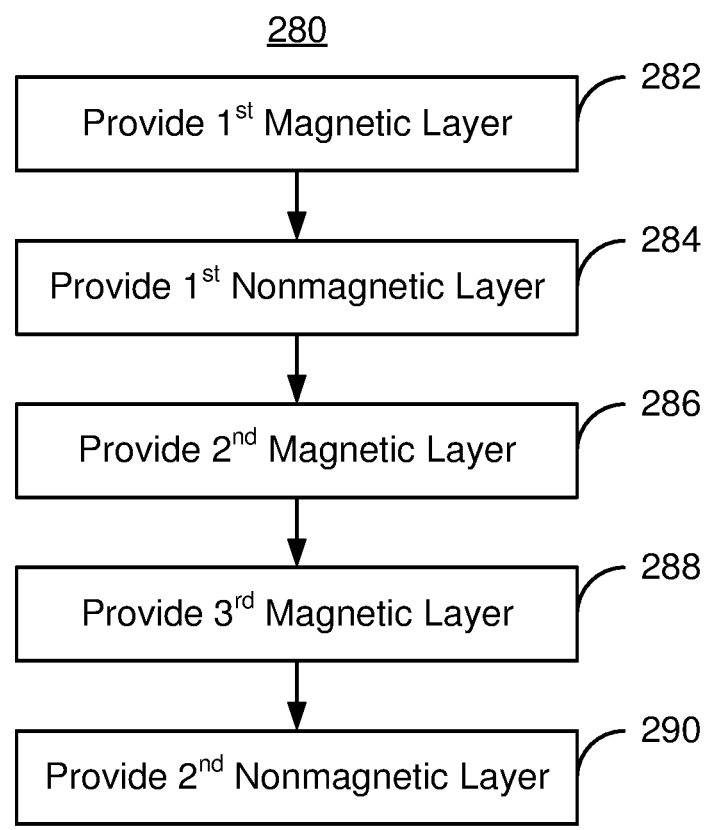
FIG. 10 is a flow chart depicting an exemplary embodiment of a method for providing a magnetic seed layer of a magnetic recording apparatus.

FIG. 10 depicts an exemplary embodiment of a method 280 for providing a magnetic seed structure such as the magnetic seed structure 142'. For simplicity, some steps may be omitted, interleaved, combined and/or include substeps. The method 280 may also be used to fabricate other magnetic recording apparatuses and/or other seed structures including but not limited to the seed structure 142 and the data storage device 100. The method 280 is described in the context of a single device but may be used to fabricate multiple magnetic storage apparatuses at substantially the same time. The method 280 is also described in the context of particular layers. A particular layer may include multiple materials and/or multiple sub-layers. The method 280 also may start after formation of other portions of the magnetic recording apparatus, such as the middle shield 122 and the insulating layer 124.

A first ferromagnetic layer 190 that adjoins, or shares an interface with, the insulating layer 124 is provided, via step 282. Step 190 may include depositing a NiFe layer.

The first nonmagnetic layer 192 is provided, via step 284. The nonmagnetic layer 192 provided in step 284 may be metallic. Step 284 may including depositing a Ru to the desired thickness.

The second magnetic layer 194 is provided, via step 286. Step 286 may include providing a CoFeB layer having the desired thickness. The third magnetic layer 196 that adjoins the second nonmagnetic layer 194 is provided, via step 288. For example, step 28 may include providing a NiFe layer. The second nonmagnetic layer 198 is provided, via step 290. Step 290 may include depositing a Ru layer having the desired thickness.

Using the method 280, the magnetic seed structure 142' may be provided. Such a magnetic seed structure 142' may improve the ability of the shield structure 140/140' to function as a shield.

Using the methods 200, 250 and/or 280, the magnetic read apparatus 110 and/or 110', the shield structure 140/140', the magnetic seed structure 142/142' and the free layer only read sensor 150 may be provided. Such read apparatuses 110 and/or 110' may have reduced sensor spacing and reduce shield-to-shield spacing. Thus, the read apparatus 110 and/or 110' having improved performance at higher density TDMR may be fabricated.

What is claimed is:

1. A magnetic read apparatus comprising:
    a first read sensor;
    a shield layer residing in a down track direction from the first read sensor;
    an insulating layer adjoining the shield layer and sharing a first interface with the shield layer, the shield layer being between the first read sensor and the insulating layer;
    a shield structure in the down track direction from the insulating layer, the shield structure comprising a magnetic seed structure, a shield pinning structure, and a shield reference structure, the magnetic seed structure in the down track direction from the insulating layer and sharing a second interface with the insulating layer, the shield pinning structure adjoining the magnetic seed structure, the shield pinning structure being between the shield reference structure and the magnetic seed structure, wherein the shield pinning structure is separated from the shield reference structure by a nonmagnetic coupling layer; and
    a second read sensor comprising a free layer and a nonmagnetic spacer layer, the nonmagnetic spacer layer adjoining the shield reference structure and residing between the shield reference structure and the free layer, the shield reference structure residing between the shield pinning structure and the nonmagnetic spacer layer.

2. The magnetic read apparatus of claim 1 wherein the shield reference structure has a permeability of at least five and not more than eight hundred.

3. The magnetic read apparatus of claim 1 wherein the shield reference structure comprises a first reference layer adjacent to the nonmagnetic spacer layer, a second reference layer, and a nonmagnetic layer between the first reference layer and the second reference layer, the first reference layer being between the nonmagnetic layer and the nonmagnetic spacer layer of the second read sensor, the first reference layer being antiferromagnetically coupled with the second reference layer with a characteristic field of at least eight hundred and not more than two thousand Oe.

4. The magnetic read apparatus of claim 3:
wherein the shield pinning structure further comprises a pinning layer and a magnetic layer magnetically coupled to the pinning layer, the magnetic layer having a pinned magnetic moment and being coupled to the second reference layer with an additional characteristic field of at least three hundred Oe and not more than one thousand five hundred Oe, the additional characteristic field being less than the characteristic field, the second reference layer having a shield structure magnetic moment.

5. The magnetic read apparatus of claim 4 wherein the first reference layer has a first thickness of at least two nanometers and not more than four nanometers and wherein the second reference layer has a second thickness of at least five nanometers and not more than seven nanometers and the magnetic layer has a third thickness of at least two nanometers and not more than five nanometers.

6. The magnetic read apparatus of claim 1 wherein the magnetic read apparatus further comprises a media-facing surface (MFS), the magnetic read apparatus further comprising:
a rear magnetic bias structure configured to magnetically bias the second read sensor in a stripe height direction perpendicular to the MFS, the second read sensor being between the MFS and at least a portion of the rear magnetic bias structure.

7. The magnetic read apparatus of claim 6 further comprising:
an insulating, nonmagnetic layer between the second read sensor and the rear magnetic bias structure.

8. The magnetic read apparatus of claim 1 wherein the magnetic seed structure further comprises:
a first ferromagnetic layer sharing the second interface with the insulating layer;
a first nonmagnetic metallic layer;
a second ferromagnetic layer, the first nonmagnetic metallic layer being between the first ferromagnetic layer and the second ferromagnetic layer;
a third ferromagnetic layer, the second ferromagnetic layer being between the first nonmagnetic metallic layer and the third ferromagnetic layer; and
a second nonmagnetic metallic layer, the third ferromagnetic layer being between the second nonmagnetic metallic layer and the second nonmagnetic metallic layer, the second nonmagnetic metallic layer adjoining the shield structure.

9. The magnetic read apparatus of claim 1 wherein the first read sensor comprises an additional free layer, the free layer being less than ninety nanometers from the additional free layer in the down track direction.

10. The magnetic read apparatus of claim 1 wherein the first read sensor comprises an additional free layer, the free layer being not more than eighty nanometers and not less than fifty nanometers from the additional free layer in the down track direction.

11. The magnetic read apparatus of claim 1 further comprising:

a top shield, the second read sensor residing between the shield structure and the top shield; and
a bottom shield, the first read sensor being between the shield layer and the bottom shield.

12. A data storage device comprising:
at least one medium; and
at least one slider comprising at least one magnetic read apparatus having a media-facing surface, each of the at least one magnetic read apparatus comprising a first read sensor, a shield layer, an insulating layer, a shield structure, and a second read sensor, the shield layer residing in a down track direction from the first read sensor, the insulating layer adjoining the shield layer and sharing a first interface with the shield layer, the shield layer being between the first read sensor and the insulating layer, the shield structure including a magnetic seed structure, a shield pinning structure, and a shield reference structure, the magnetic seed structure being in the down track direction from the insulating layer, the magnetic seed structure sharing a second interface with the insulating layer, the shield pinning structure being in the down track direction from and adjoining the magnetic seed structure, wherein the shield pinning structure is separated from the shield reference structure by a nonmagnetic coupling layer, the second read sensor comprising a free layer and a nonmagnetic spacer layer, the nonmagnetic spacer layer adjoining the shield reference structure and residing between the shield reference structure and the free layer, the shield reference structure residing between the shield pinning structure and the nonmagnetic spacer layer.

13. The data storage device of claim 12 wherein the shield reference structure comprises a first reference layer adjacent to the nonmagnetic spacer layer, a second reference layer, and a nonmagnetic layer between the first reference layer and the second reference layer, the first reference layer being between the nonmagnetic layer and the nonmagnetic spacer layer of the second read sensor, the shield reference structure having a permeability of at least five and not more than eight hundred, the first reference layer being antiferromagnetically coupled with the second reference layer with a characteristic field of at least eight hundred and not more than two thousand Oe.

14. The data storage device of claim 13
wherein the shield pinning structure further comprises a pinning layer and a magnetic layer magnetically coupled to the pinning layer, the magnetic layer having a pinned magnetic moment and being coupled to the second reference layer with an additional characteristic field of at least three hundred Oe and not more than one thousand five hundred Oe, the additional characteristic field being less than the characteristic field, the second reference layer having a shield structure magnetic moment.

15. The data storage device of claim 12 wherein the magnetic read apparatus has a media-facing surface (MFS) and further comprises:
a rear magnetic bias structure configured to magnetically bias the second read sensor in a stripe height direction perpendicular to the MFS, the second read sensor being between the MFS and at least a portion of the rear magnetic bias structure.

16. The data storage device claim 12 wherein the magnetic seed structure further comprises:
a first ferromagnetic layer sharing the second interface with the insulating layer;

a first nonmagnetic metallic layer;

a second ferromagnetic layer, the first nonmagnetic metallic layer being between the first ferromagnetic layer and the second ferromagnetic layer;

a third ferromagnetic layer, the second ferromagnetic layer being between the first nonmagnetic metallic layer and the third ferromagnetic layer; and a second nonmagnetic metallic layer, the third ferromagnetic layer being between the second nonmagnetic metallic layer and the second nonmagnetic metallic layer, the second nonmagnetic metallic layer adjoining the shield structure.

17. The data storage device of claim 12 wherein the first read sensor comprises an additional free layer, the additional free layer being not more than eighty nanometers and not less than fifty nanometers from the free layer in the down track direction.

18. A method for providing a magnetic read apparatus, the method comprising:

providing a first read sensor;

providing a shield layer residing in a down track direction from the first read sensor;

providing an insulating layer adjoining the shield layer and sharing a first interface with the shield layer, the shield layer being between the first read sensor and the insulating layer;

providing a shield structure, the shield structure comprising a magnetic seed structure, a shield pinning structure, and a shield reference structure, the magnetic seed structure in the down track direction from the insulating layer and sharing a second interface with the insulating layer, the shield pinning structure being between the magnetic seed structure and the shield reference structure, the shield pinning structure adjoining the magnetic seed structure and separated from the shield reference structure by a nonmagnetic coupling layer; and providing a second read sensor comprising a free layer and a nonmagnetic spacer layer, the nonmagnetic spacer layer adjoining the shield reference structure and residing between the shield reference structure and the free layer.

19. The method of claim 18 wherein providing the shield reference structure further comprises:

providing a first reference layer adjacent to the nonmagnetic spacer layer;

providing a nonmagnetic layer;

providing a second reference layer, the nonmagnetic layer being between the first reference layer and the second reference layer, the first reference layer being between the nonmagnetic layer and the nonmagnetic spacer layer of the second read sensor, the first reference layer being antiferromagnetically coupled with the second reference layer with a characteristic field of at least eight hundred and not more than two thousand Oe, the shield reference structure having a permeability of at least five and not more than eight hundred.

20. The method of claim 19:

wherein providing the shield pinning structure further comprises:

providing a pinning layer; and providing a magnetic layer magnetically coupled to the pinning layer, the magnetic layer having a pinned magnetic moment and being coupled to the second reference layer with an additional characteristic field of at least three hundred Oe and not more than one thousand five hundred Oe, the additional characteristic field being less than the characteristic field, the second reference layer having a shield structure magnetic moment.

21. The method of claim 18 wherein the magnetic read apparatus further includes a media-facing surface (MFS), and the method further comprises:

providing a rear magnetic bias structure configured to magnetically bias the second read sensor in a stripe height direction perpendicular to the MFS, the second read sensor being between the MFS and at least a portion of the rear magnetic bias structure.

22. The method of claim 18 wherein providing the magnetic seed structure further comprises:

providing a first ferromagnetic layer sharing the second interface with the insulating layer;

providing a first nonmagnetic metallic layer;

providing a second ferromagnetic layer, the first nonmagnetic metallic layer being between the first ferromagnetic layer and the second ferromagnetic layer;

providing a third ferromagnetic layer, the second ferromagnetic layer being between the first nonmagnetic metallic layer and the third ferromagnetic layer; and providing a second nonmagnetic metallic layer, the third ferromagnetic layer being between the second nonmagnetic metallic layer and the second nonmagnetic metallic layer, the second nonmagnetic metallic layer adjoining the shield structure.

23. The method of claim 18 wherein the first read sensor comprises an additional free layer, the additional free layer being not more than eighty nanometers and not less than fifty nanometers from the free layer in the down track direction.

* * * * *